US009633184B2

United States Patent
Ben Ari et al.

(10) Patent No.: US 9,633,184 B2
(45) Date of Patent: Apr. 25, 2017

(54) DYNAMIC AUTHORIZATION

(71) Applicant: Google Inc., Mountain View, CA (US)

(72) Inventors: Maya Ben Ari, Palo Alto, CA (US); Mayank Upadhyay, Palo Alto, CA (US); Adrian Ludwig, San Francisco, CA (US); Tal Dayan, Los Gatos, CA (US)

(73) Assignee: GOOGLE INC., Mountain View, CA (US)

( * ) Notice: Subject to any disclaimer, the term of this patent is extended or adjusted under 35 U.S.C. 154(b) by 107 days.

(21) Appl. No.: 14/291,677

(22) Filed: May 30, 2014

(65) Prior Publication Data
US 2015/0347725 A1 Dec. 3, 2015

(51) Int. Cl.
| | |
|---|---|
| *G06F 21/31* | (2013.01) |
| *G06N 99/00* | (2010.01) |
| *H04W 12/06* | (2009.01) |
| *H04L 29/08* | (2006.01) |
| *H04W 12/08* | (2009.01) |
| *H04W 88/02* | (2009.01) |

(52) U.S. Cl.
CPC .......... *G06F 21/31* (2013.01); *G06N 99/005* (2013.01); *H04W 12/06* (2013.01); *H04L 67/306* (2013.01); *H04W 12/08* (2013.01); *H04W 88/02* (2013.01)

(58) Field of Classification Search
CPC ..... G06F 21/31; G06N 99/005; H04W 12/06; H04W 88/02; H04W 12/08; H04L 67/306
See application file for complete search history.

(56) References Cited

U.S. PATENT DOCUMENTS 8,387,141 B1 2/2013 Zhukov et al.
8,412,158 B2 4/2013 Forutanpour et al.
(Continued)

FOREIGN PATENT DOCUMENTS

EP 2375799 A1 10/2011
EP 2662797 A1 11/2013
(Continued)

OTHER PUBLICATIONS

International Search Report and Written Opinion issued in PCT/US2015/032454 on Aug. 20, 2015.
(Continued)

*Primary Examiner* — Harunur Rashid
*Assistant Examiner* — Cheng-Feng Huang
(74) *Attorney, Agent, or Firm* — Morris & Kamlay LLP

(57) ABSTRACT

Systems and techniques are provided for dynamic authorization. A signal may be received from a sensor. A concept may be determined from the signal. The concept may be a location of a computing device, an action being performed with the computing device, an identity of a user of the computing device, or a temporal context for the computing device. A current pattern may be determined from the concept. The current pattern may be matched to a stored pattern. The stored pattern may be associated with a security outcome. The security outcome may be sent to be implemented. A security message may displayed indicating the security outcome and part of the stored pattern that was matched to the current pattern. The security outcome may be causing presentation of an authentication prompt or not causing presentation of an authentication prompt.

21 Claims, 5 Drawing Sheets

(56) References Cited

U.S. PATENT DOCUMENTS

| | | | |
|---|---|---|---|
| 8,713,704 B2* | 4/2014 | Davis | H04L 9/3231 |
| | | | 713/166 |
| 2006/0074986 A1 | 4/2006 | Mallalieu et al. | |
| 2007/0150745 A1* | 6/2007 | Peirce | G06F 21/32 |
| | | | 713/186 |
| 2008/0101658 A1* | 5/2008 | Ahern | G06F 21/32 |
| | | | 382/115 |
| 2011/0016534 A1 | 1/2011 | Jakobsson et al. | |
| 2012/0007713 A1 | 1/2012 | Nasiri et al. | |
| 2013/0055348 A1* | 2/2013 | Strauss | G06F 21/31 |
| | | | 726/3 |
| 2013/0061305 A1 | 3/2013 | Bruso et al. | |
| 2013/0067566 A1 | 3/2013 | Oh | |
| 2013/0227678 A1 | 8/2013 | Kang et al. | |
| 2014/0010417 A1 | 1/2014 | Hwang et al. | |
| 2014/0033326 A1 | 1/2014 | Chien | |
| 2014/0096231 A1 | 4/2014 | Smith et al. | |
| 2014/0289820 A1 | 9/2014 | Lindemann et al. | |
| 2014/0289833 A1* | 9/2014 | Briceno | H04L 63/08 |
| | | | 726/7 |
| 2014/0380424 A1* | 12/2014 | Thompson | G06F 21/31 |
| | | | 726/4 |
| 2015/0373051 A1 | 12/2015 | Dayan et al. | |

FOREIGN PATENT DOCUMENTS

| | | |
|---|---|---|
| WO | 2009026337 A1 | 2/2009 |
| WO | 2011057287 A1 | 5/2011 |
| WO | 2013131265 A1 | 9/2013 |

OTHER PUBLICATIONS

Riva, et al., "Progressive authentication: deciding when to authenticate on mobile phones", Security'12 Proceedings of the 21st USENIX conference on Security symposium, Aug. 8, 2012, SENIX Association Berkeley, CA, USA.

Shi, et al., "Implicit Authentication through Learning User Behavior", ISC'10 Proceedings of the 13th international conference on Information security, Oct. 25, 2010, Springer-Verlag Berlin, Heidelberg.

* cited by examiner

DYNAMIC AUTHORIZATION

BACKGROUND

Mobile computing devices, such as smartphones and tablets, may require users to authenticate themselves to the device before allowing the user to perform various actions. For example, a smartphone lock screen may require the user to enter a PIN to unlock the smartphone, and may also require the user to enter passwords at various other points during usage of the smartphone. This may result in frequent interruption of the user's use of the mobile computing device, as the user has to stop whatever action they were attempting to authenticate themselves to the device. The user may also set security preferences so that the mobile computing device doesn't present certain prompts for authentication. For example, a smartphone's user may set preferences that prevent the smartphone from requesting a PIN to unlock the smartphone. This may streamline the user's experience, as the user may see fewer interruptions, but may make the mobile computing device less secure, as any other user could unlock and use the smartphone.

Certain signals from the mobile computing device may be used to more intelligently present authentication prompts to the user. For example, a PIN may be required to unlock a smartphone during certain times of day, but not during others. The mobile computing device may make decisions on when to require the user to authenticate based on detected usage patterns for the user. These decisions may be opaque to the user, who may not be aware of why their mobile computing device requires authentication in certain situations but not in others, and may be unable adjust the decisions made by the smartphone.

BRIEF SUMMARY

According to an embodiment of the disclosed subject matter, a signal may be received from a sensor. A concept may be determined from the signal. The concept may be a location of a computing device, an action being performed with the computing device, an identity of a user of the computing device, or a temporal context for the computing device. A current pattern may be determined from the concept. The current pattern may be matched to a stored pattern. The stored pattern may be associated with a security outcome. The security outcome may be sent to be implemented. A security message may displayed indicating the security outcome and part of the stored pattern that was matched to the current pattern.

It may be determined that a security preference associated with the stored pattern overrides the security outcome associated with the stored pattern. The security outcome associated with the security preference may be sent instead of the security outcome associated with the stored pattern. The security message indicating the security outcome associated with the security preference may be displayed instead of the security outcome associated with the stored pattern. The security outcome may be causing presentation of an authentication prompt or not causing presentation of an authentication prompt.

The current pattern may include a location the computing device is being used in and an identity of a user with access to the computing device. The current pattern may be stored with the stored pattern. The stored pattern may be modified based on the current pattern or a new stored pattern may be created based on the current pattern. A machine learning system may be applied to the current pattern and the stored pattern to modify the stored pattern or create a new stored pattern.

The security outcome associated with the stored pattern may be based on a level of confidence that the user of the computing device is an owner of the computing device or authorized user of the computing device when the stored pattern is matched by the current pattern. The sensor may be a camera, a microphone, a touchscreen, a GPS chip, a WiFi radio, a cellular radio, an accelerometer, a clock, an input detector, a fingerprint scanner, or a moisture sensor.

An authentication prompt may include requesting entry of a PIN, requesting entry of a password, requesting entry of a touch pattern, requesting a facial image, requesting a voiceprint, or requesting a fingerprint. Sending the security outcome to be implemented may include sending the security outcome to an invoking application, wherein the application invokes the determination of a security outcome based on the actions of a current user of the computing device.

According to an embodiment of the disclosed subject matter, a means for receiving a signal from a sensor, a means for determining a concept from the a signal, wherein the a concept is a location of a computing device, an action being performed with the computing device, an identity of a user of the computing device, or a temporal context for the computing device, a means for determining a current pattern from the a concept, a means for matching the current pattern to a stored pattern, where the stored pattern may be associated with a security outcome, a means for sending the security outcome to be implemented, a means for displaying a security message indicating the security outcome and at least part of the stored pattern that was matched to the current pattern, a means for determining a security preference associated with the stored pattern that overrides the security outcome associated with the stored pattern, a means for sending a security outcome associated with the security preference instead of the security outcome associated with the stored pattern, a means for displaying the security message indicating the security outcome associated with the security preference instead of the security outcome associated with the stored pattern, a means for storing the current pattern with the stored pattern, a means for modifying the stored pattern based on the current pattern, a means for creating a new stored pattern based on the current pattern, and a means for applying a machine learning system to the current pattern and the stored pattern, are included.

A means for receiving signals from sensors, wherein the sensors may include hardware and software sensors of a computing device, a means for determining concepts from the signals, where each of the concepts regards an aspect of the current usage context of the computing device, a means for detecting a current pattern from the concepts, where the current pattern regards the current usage context of the computing device, a means for storing the current pattern with stored patterns, a means for applying a machine learning system to the current pattern and the stored patterns to modify one of the stored patterns, a means for associating a security outcome with the stored pattern modified by the machine learning system, a means for storing the stored pattern, modified by the machine learning system, and associated security outcome with the plurality of stored patterns, a means for receiving a second set of signals from the sensors, a means for determining a second set of concepts from the second set of signals, a means for detecting a second current pattern for the second set of signals, a means for matching the second current pattern to one of the stored patterns, a means for sending a security outcome associated with the stored pattern matched with the second current pattern to be implemented, and a means for displaying a message indicating the stored pattern matched with the second current pattern and the security outcome, a means for determining a security preference associated with the stored pattern that overrides the security outcome associated with the stored pattern, a means for sending a security outcome associated with the security preference instead of the security outcome associated with the stored pattern, and a means for displaying the message indicating the security outcome associated with the security preference instead of the security outcome associated with the stored pattern, are also included.

Systems and techniques disclosed herein may allow for dynamic authorization. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
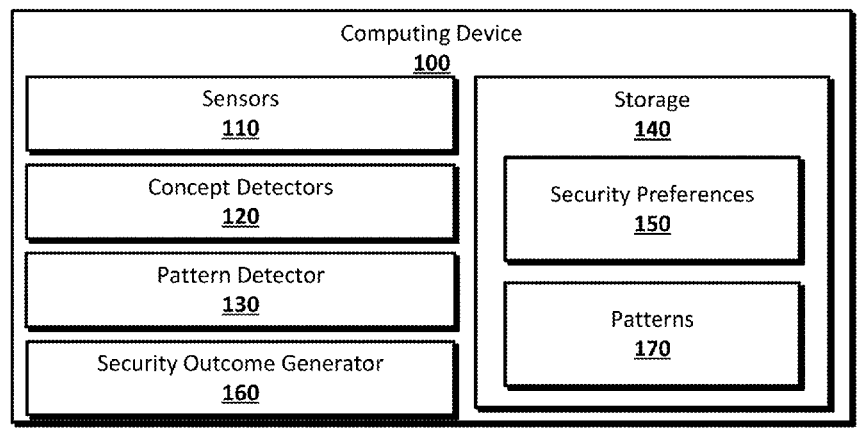
FIG. 1 shows an example system suitable for dynamic authorization according to an implementation of the disclosed subject matter.
Figure 2:
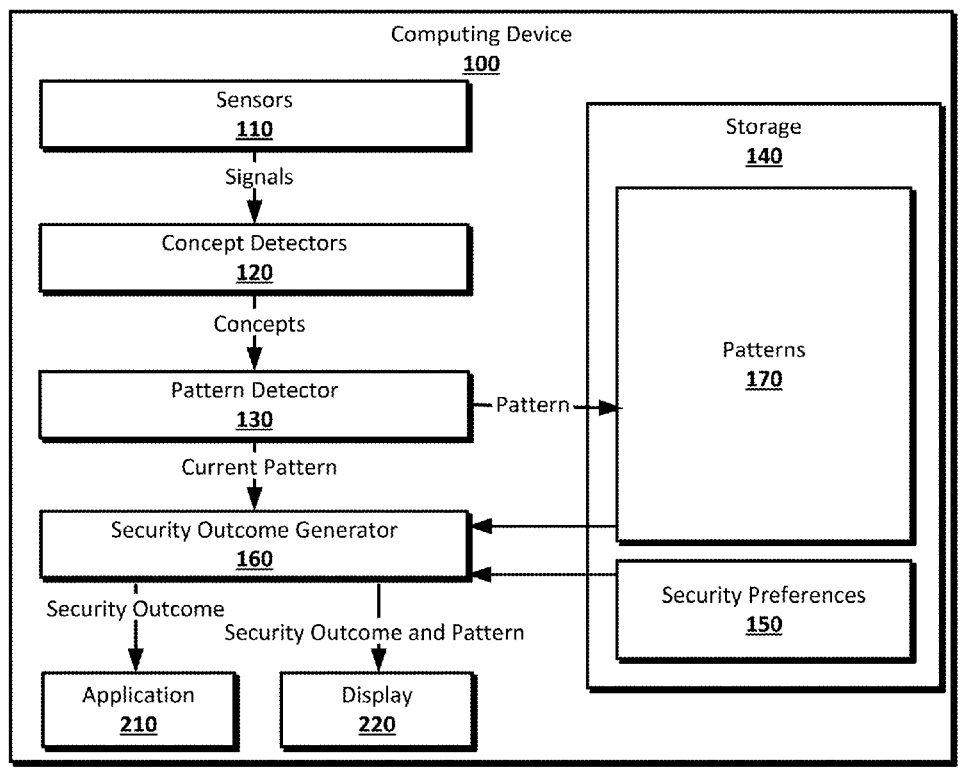
FIG. 2 shows an example arrangement for dynamic authorization according to an implementation of the disclosed subject matter.

Dynamic authorization may be used on a computing device to allow for presentation of authentication prompts to a user based on the user's usage patterns while presenting explanations to the user of why authentications prompts are presented or not presented, and allowing the user to adjust the situations which result in the presentation of an authentication prompt. Signals from various sensors on a computing device may be analyzed to determine concepts associated with the current state of the computing device, such as who is using the computing device, where the computing device is located, what actions are being performed with the computing device, and the current temporal context for the computing device. For example, the signals may be used to determine that a smartphone is being used by its owner in the owner's car on a Sunday while the owner is driving to the grocery store. The concepts may be used to determine patterns of usage by the user. The patterns may be used to make decisions as to when to present authentication prompts to any party using the phone. Any authentication prompt, or lack of authentication prompt in a situation that may normally require authentication, may be accompanied by a message displayed to the current user of the computing device, explaining the pattern that resulted in the authentication prompt or lack thereof. The user of the computing device may make changes to when authentication prompts are presented based on the patterns of usage.

A computing device may have various sensors for generating and receiving various kinds of data which may be used as signals for dynamic authorization. The sensors may be hardware sensors, such as, for example, cameras, microphones, accelerometers, gyroscopes, Global Positioning System (GPS) chips, Bluetooth chips, thermometers, touchscreens, hard keys, cellular and WiFi radios, moisture sensors, pressure sensors, and fingerprint scanners. The sensors may also be software based, for example, generating signals from data received through hardware. For example, signals regarding the location of other computing devices owned by the user of a computing device may be generated by software sensors that analyze data received from external sources, and signals regarding the identity of the current user of a computing device may be generated by analyzing data input by the current user, such as, for example, passwords, PINs, words and phrasing used in text input, and searches conducted by the current user. For example, a smartphone may include a camera, a microphone, a GPS chip, a touchscreen, and an accelerometer. Images from the camera, sounds picked up by the microphone, the location and movement of the smartphone according to the GPS chip, the angle and positioning of the smartphone detected by the accelerometer, and the size of the current user's fingers may all be signals used for dynamic authorization.

The signals from the sensors of a computing device may be passed to signal collectors, which may be part of an operating system or separate component of the platform used by the computing device. The signal collectors may gather signals from the various sensors of the computing device, change the signals into a format to allow for analysis of the signals, and pass the signals on. The signal collectors may receive copies of the signals from the sensors, as the signals may also be used in the operation of the computing device. For example, a speech segment picked up by the microphone may be part of a phone call. The signal collectors may receive a copy of the audio without preventing the audio from being sent out as part of the phone call.

The signals may be used to determine various concepts regarding the context of the computing device. For example, the signals may be analyzed to determine the current location of the computing device, who is using the computing device, the temporal context of the computing device, and what actions are being performed with the computing device. Concept detectors may be used to determine the concepts, and may receive and analyze the signals from the sensors, which may be passed through the signal collectors.

For example, the location of a smartphone may be determined based on signals from GPS chip, which may provide an GPS based location, a WiFi radio, based on connection to a WiFi network with known location or the presence of known WiFi networks in the vicinity of the smartphone, or a cellular radio based on nearby cellular towers. The smartphone may be determined to be at the user's house because the smartphone is connected to the user's home WiFi network. The location determined for a computing device may include geographic locations and other location types. For example, a smartphone's location may be determined to be at a certain latitude and longitude and also inside a specific restaurant, or in a specific vehicle that belongs to the computing device's owner, or in an airplane.

An identity of the current user of the computing device may be determined based on signals from hardware sensors, such as voice recognition from audio picked up by the microphone, facial recognition based on images captured by the camera, touchscreen usage patterns, an angle of the computing device as determine by an accelerometer, a fingerprint scanner recognizing or not recognizing a scanned fingerprint. The identity of the current user may also be determined based on signals from software sensors, for example, by detecting that the current user has successfully or unsuccessfully entered a PIN or password associated with a particular user of the device, and by analyzing application usage by the current user including text entered and searches conducted. For example, a smartphone may detect that the current user is playing a game which is not normally played by the owner of the computing device. The game may be intended for children, which may allow the determination that the current user is a child who may be related to the owner of the computing device.

The actions being performed with the computing device may be determined based on signals from, for example, hardware sensors. For example, signals from a GPS chip and accelerometer may be used to determine how quickly the computing device is moving, in what direction, and along what path, which may allow for the determination that the computing device is, for example, in a moving car, a stopped car, in someone's pocket while they're sitting still, walking, or biking. For example, a smartphone may have GPS chip signals indicating that the smartphone is located on a major highway, but is not moving. This may allow for the determination that the smartphone is in a car that is stopped in traffic.

The temporal context of the computing device may be determined based on signals from, for example, a system clock on the computing device, or from temporal data, including time, day, data, year, and time zone, received using a WiFi or cellular radio of the computing device. The temporal context of the computing device may take into account both the current time zone in which the computing device is located and any previous time zones in which the computing device has been located to, for example, determine if the computing device is travelling.

The concepts determined from the signals, for example, by the concept detectors, may be used to detect usage patterns for the computing device. The usage patterns may be patterns related to the way in which the owner of the computing device uses and interacts with the computing device. For example, a recurring pattern in the concepts may be that on Sunday, sometime between 12:00 pm and 2:00 pm, the computing device may be in its owner's car, in the owner's pocket, on a road between the owner's home and a specific grocery store, moving in the direction of the grocery store. This may allow for the determination of a pattern, specifically that the owner of the computing device may drive to the grocery store every Sunday between 12:00 pm and 2:00 pm. Patterns may be detected from concepts by, for example, a pattern detector, which may detect patterns in any suitable manner, such as, for example, using any suitable machine learning system that may be capable of both supervised and unsupervised learning. The pattern detector may be, for example, a component of the operating system or platform used by the computing device, or separate component or application installed on the computing device.

Patterns detected from the concepts may be stored on the computing device. The stored patterns may then be used to generate security outcomes based on patterns currently detected by the computing device, for example, by a security outcome generator. The security outcome generator may be, for example, a component of the operating system or platform used by the computing device, or separate component or application installed on the computing device. A current pattern detected based on concepts determined from contemporaneous signals may be compared to stored patterns to determine if an authentication prompt needs to be presented to the current user. For example, there may be a recurring pattern of the computing device's owner driving to the grocery store on Sunday between 12:00 pm and 2:00 pm. The current pattern may indicate that the computing device is currently in its owner's car being driven to that grocery store on a Sunday at 1:30 pm. When the current user attempts to unlock the computing device, the current pattern may be compared with the previously stored patterns to determine with a high level of confidence that the owner of the computing device is attempting to unlock the computing device. No authentication prompt, for example, requesting the entry of a PIN, may be shown, and the current user may be able to unlock the computing device without authenticating, as the current pattern may indicate the current user is the owner.

The lack of an authentication prompt may occur even in the absence of other signals that the owner is using the computing device, although may be subject to other signals that indicate that it is not the owner using the computing device. For example, if the signals determine that the current user of the computing device is not the owner, for example, based on facial recognition, the pattern may be determined to not match the stored patterns, and an authentication prompt may be presented. Authentication prompts may also be presented when the current pattern matches a stored pattern that indicates the computing device is not a secure context. For example, the computing device may be on a desk in an office where it may be accessed by any number of people whom the owner may not wish to have access to the computing device. The actions the current user is attempting to perform may also affect whether an authentication prompt is shown. For example, some current patterns may allow for a current user to unlock the computing device without an authentication prompt, but be shown an authentication prompt if they attempt to use a banking application or to access or alter any of the owner's personal data on the computing device.

The decision of whether or not to show an authentication prompt to the current user of a computing device may displayed to the current user. For example, if the security outcome generator determines, based on the current pattern for a smartphone, that an authentication prompt requesting a PIN to unlock the smartphone should be required of the current user, the current pattern that leads to the determination may be displayed on the lock screen of the smartphone. The display may include text that states, for example, "Please enter a PIN to unlock because: the phone is resting on a table in your office on a weekday afternoon." The explanation may include the pattern that was used to determine security outcome, for example, as detected by the pattern detector from the concepts determined by the concept detectors. This may allow the owner of a computing device to understand why authentication prompts are and are not presented in various usage situations.

The security outcomes for stored patterns may also be altered according to user preference. For example, the owner of a computing device may view a list of the stored patterns that have been detected over the lifetime of the use of the computing device by, for example, the pattern detector, and the security outcomes associated with the stored patterns. The user, who may be the owner of the computing device, may then alter the security outcomes, for example, to better suit the owner's preferences for security and ease of access. For example, the owner of a smartphone may notice that the smartphone does not require the entry of PIN to unlock the smartphone when the current pattern is that of resting on a table in the owner's home after 6:00 pm on a weekday. The owner may alter the security outcome for the stored patterns that were matched to the current pattern, so that future detection of that current pattern results in an authentication prompt requiring a PIN to unlock the smartphone. In this way, the security outcomes may be customized for any of the stored patterns for a computing device, allowing the owner situational control of the security of the computing device.

FIG. 1 shows an example system suitable for dynamic authorization according to an implementation of the disclosed subject matter. A computing device 100 may include sensors 110, concept detectors 120, a pattern detector 130, a security outcome generator 160, and storage 140. The computing device 100 may be any suitable device, such as, for example, a computer 20 as described in FIG. 6, having sensors 110 and for implementing concept detectors 120, a pattern detector 130, a security outcome generator 160, and storage 140. The computing device 100 may be a single computing device, or may include multiple connected computing devices, and may be, for example, a mobile computing device, such as a tablet or smartphone, running a mobile operating system that may be part of a mobile platform. The concept detectors 120 may use signals from the sensors 110 to determine concepts about the context of the computing device 100. The pattern detector 130 may detect patterns from the concepts determined by the concept detectors 120, which may be stored as patterns 170, and current patterns may be compared with the previously stored patterns 170 by the security outcome generator 160 to determine a security outcome for the computing device 100. The storage 140 may store security preferences 150 and the patterns 170 in any suitable format. The components of the computing device 100 may also be implemented wholly or partially remotely, for example, using cloud computing and cloud storage. For example, the pattern detector 130 may be implemented on the computing device 100, but may use processing time on a remote server as well.

The sensors 110 may be any suitable sensors for generating signals regarding the state of the computing device 100. The sensors 110 may be, for example, hardware sensors, such as a GPS chip, a WiFi radio, a cellular radio, a camera, a microphone, a touchscreen, an accelerometer, a pressure sensor, a moisture sensor, and a fingerprint scanner. The sensors 110 may also be, for example, software sensors, such as a system clock, an input detector, or any component of the computing device 100, such as the operating system, capable of receiving external data relevant to the current state of the computing device 100. The sensors 110 may generate signals that may be used by the concept detectors 120. The signals may be gathered and formatted by signal collectors on the computing device 100 before being passed to the concept detectors 120.

The concept detectors 120 may be any suitable component of the computing device 100, such as, for example, a component of the operating system or platform using by the computing device 100, that may receive the signals that were generated by the sensors and determine concepts relating to the state of the computing device 100. For example, the concept detectors 120 may use the signals to determine an identity of a person using the computing device 100, where the computing device 100 is located both geographically and structurally, what is being done with the computing device 100 physically, for example, whether the computing device 100 is resting or moving and at what speed, and the temporal context of the computing device 100, for example, the current time, day, date, day of week, and time zone.

Concepts determined by the concept detectors 120 may be used by the pattern detector 130 to detect patterns regarding the usage contexts of the computing device 100. The pattern detector 130 may be any suitable component of the computing device 100, such as, for example, a component of the operating system or platform used by the computing device 100. For example, the pattern detector 130 may use any suitable machine learning system to detect patterns in the received concepts over time. Detected patterns may be stored in the storage 140 as the patterns 170. A pattern may be, for example, a particular recurring usage context of the computing device 100 based on the concepts determined by the concept detectors 120. For example, concepts from the concept detectors 120 may show that the computing device 100 is located in a park, moving at a walking pace, in the hands of the owner of the computing device 100, every Saturday around 10:00 am. The pattern detector 130 may, after receiving the same concepts multiple Saturdays, detect a pattern that the owner of the computing device 100 walks in the park while holding the computing device 100 every Saturday around 10:00 am. This pattern may be stored with the patterns 170. The patterns 170 may include the stored patterns, which may be based on the concepts from the concept detectors 120, along with security outcomes associated with the stored patterns. For example, certain stored patterns may indicate that the owner of the computing device 100 is highly likely to be the current user of the computing device 100 when such a pattern is detected, and therefore authentication prompts may not be needed, for example, to unlock the computing device 100. The security outcomes stored with the patterns 170 may be granular so that, for example, detection of the same current pattern may lead to different security outcomes depending on the action being performed on the computing device 100. For example, a detected current pattern may lead to an authentication prompt for use of a banking application, but not for unlocking the computing device 100.

The pattern detector 130 may continuously detect the current pattern, or usage context, of the computing device 100 from continuously determined concepts from the concept detectors 120, and use the current patterns to detect new, and update previously stored, patterns in the patterns 170. The current pattern may also be sent to the security outcome generator 160 when a security outcome is needed, for example, when the current user of the computing device 100 attempts an action that might require an authentication prompt in order to ensure the security of the computing device 100.

The security outcome generator 160 may be any suitable component of the computing device 100, such as, for example, a component of the operating system or platform used by the computing device 100, for determining security outcomes for the computing device 100. For example, the security outcome generator 160 may be invoked when a user of the computing device 100 attempts an action, such as unlocking the computing device 100, making a purchase through an application, or using a banking application, which may require some form of authentication. The security outcome generator 160 may receive the current pattern from the pattern detector 130, and compare the current pattern to stored patterns in the patterns 170, to determine whether the current pattern indicates that an authentication prompt is needed. The current pattern may be matched to one of the stored patterns in the patterns 170, and the security outcome associated with the stored pattern may be implemented. For example, if the current pattern matches a stored pattern that indicates that an authentication prompt is needed, an authentication prompt may be shown to the current user, who may be required to enter proper credentials, such as a PIN, password, fingerprint, or pass facial or voice recognition, before being allowed to continue the action on the computing device 100 that invoked the security outcome generator 160. The security outcome generator 160 may also send a message regarding the matched pattern to the display of the computing device 100, to be viewed by a user.

The security outcome generator 160 may also operate continuously. For example, the security outcome generator 160 may receive the current pattern continuously, and may monitor the current patterns for matches in the stored patterns, so that at any given moment in the operation of the computing device 100, the security outcome generator 160 may be aware of a stored pattern that matches the current pattern. When the security outcome generator 160 is invoked, the security outcome generator may provide the security outcome based on the most recent matching of the current pattern to a stored pattern.

The security preferences 150 may include changes to the security outcomes associated with stored patterns in the patterns 170 made by, for example, an owner or other authorized user of the computing device 100. For example, the owner of the computing device 100 may see a message displayed on the computing device 100 when a particular pattern is detected, explaining the pattern and the presentation of an authentication prompt based on the pattern. The owner of the computing device 100 may enter a change to the security outcome for the particular pattern, as the owner may not wish to be presented with an authentication prompt when that particular pattern is detected. The change may be stored in the security preferences 150. The security outcome generator 160 may check the security preferences 150 after matching a pattern in the patterns 170 to determine if the security outcome for the pattern should be overridden by a security outcome specified in the security preferences 150.

Figure 3:
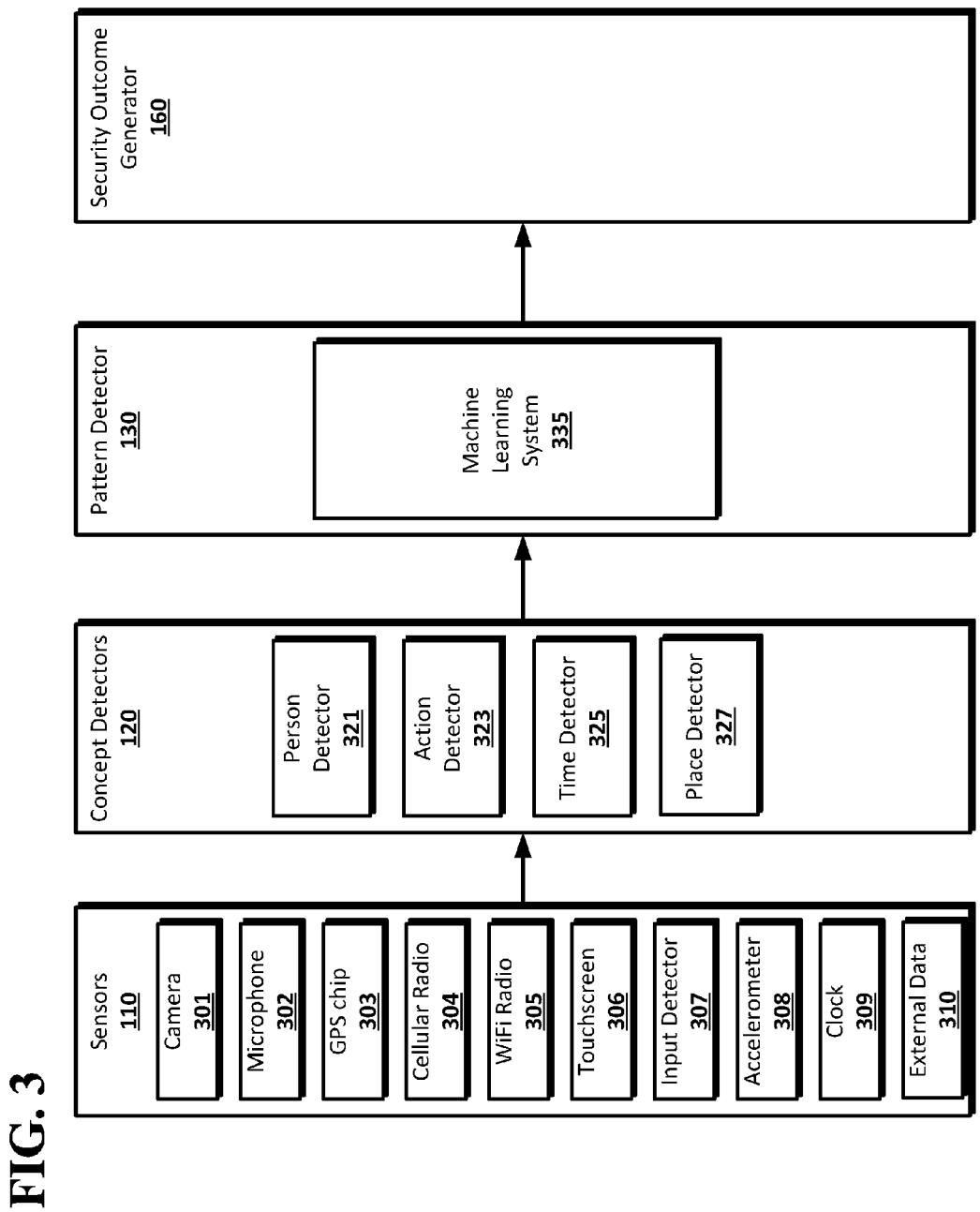
FIG. 3 shows an example arrangement for dynamic authorization according to an implementation of the disclosed subject matter.

FIG. 3 shows an example arrangement for dynamic authorization according to an implementation of the disclosed subject matter. The sensors 110 may generate signals which may be gathered by signal collectors and passed to the concept detectors 120. The signals may be generate continuously or discretely, for example, depending on the nature of the signal, the state of the computing device 100, and the considerations such as battery life of the computing device 100. For example, a microphone may continuously generate audio signals based on any picked up audio, while a camera may only be used to generate images for facial recognition when the computing device 100 is in an environment where such images may be useful, and not, for example, when the computing device 100 is located in a person's pocket.

The concept detectors 120 may continuously or discretely receive the signals and determine the concepts associated with the current context of the computing device 100. The concepts may be continuously updated, for example, based on continuously received signals from the sensors 110, or discretely, for example, when receiving signals that are only updated discretely by the sensors 110. The concept detectors 120 may send determined concepts to the pattern detector 130.

The pattern detector 130 may detect patterns in any concepts receive from the concept detectors 120, continuously or discretely depending on how frequently concepts are sent. The pattern detector 130 may detect a current pattern, which may indicate the current state of the computing device 100. The pattern detector 130 may store current patterns in the patterns 170, and may detect recurring patterns, for example, states that repeats at given times of day or days of the week, or repeating usages, which may be used to indicate the security level necessary to ensure the security of the computing device 100. For example, the pattern detector 130 may apply an unsupervised machine learning system to detect patterns from the received concepts. The detected recurring patterns stored in the patterns 170 may be associated with security outcomes.

The application 210 may be run on the computing device 100. The application 210 may be, for example, a component of the operating system or platform used by the computing device 100, such as the lock-screen process, or may be a separate application, such as a banking application. While running, the application 210 may attempt to perform an action, based on input from the user of the computing device 100, which may invoke the security outcome generator 160. For example, the application 210 may attempt to unlock the computing device 100, or connect to a bank account. The security outcome generator 160 may receive the current pattern from the pattern detector 130. The current pattern may be the most recent pattern detected by the pattern detector 130 based on the most recently received concepts from the concept detectors 120. The security outcome generator 160 may compare the current pattern to stored patterns in the patterns 170 to determine if the current pattern matches any of the stored patterns. The match may not need to be exact. For example, the current pattern may match one of the patterns 170 except for the identity of the current user, which may be indeterminate according to the current pattern. The match may be based on, for example, probabilistic matching or, for example, on a machine learning system. For example, the machine learning system used by the pattern detector 130 may also be used by the security outcome generator 160 to match the current pattern to stored patterns, for example, based on scores, rankings, or predictions generated by the machine learning system. The machine learning system of the pattern detector 130 may, for example, score each stored pattern in the patterns 170 based on how well each stored pattern matches the current pattern, and determine that the highest scoring stored pattern is the match for the current pattern, subject to a minimum score threshold.

The techniques disclosed herein may be applied using machine-learned models generated using supervised learning data such as labeled examples. The labeled examples may be input into a machine learning system and the output from the machine learning system may be a machine-learned model that contains weights that are generated in response to the labeled data. The labeled examples may contain both an outcome and properties associated with a specific instance. It will be understood that the weights and outcomes may be unitless numerical values, percentages, counts of occurrences, or other quantification. A machine learning system may receive labeled data (e.g., labeled examples) to develop a machine-learned model that contains weights that are generated in response to the supervised labeled data. One or more rules may be created by a machine-learned model.

If a match for the current pattern is found in the patterns 170, the security outcome generator 160 may check the security preferences 150 to determine if any change has been to the security outcome for the matched pattern. If no change has been made, the security outcome generator 160 may use the security outcome stored in the patterns 170, otherwise, the security outcome generator 160 may use the overriding security outcome from the security preferences 150.

The security outcome determined by the security outcome generator 160 may be sent to the application 210 responsible for invoking the security outcome generator 160. The application 210 may then function in accordance with the security outcome. For example, if the security outcome indicates that an authentication prompt is required, for example, because the current pattern indicates that the owner of the computing device 100 may not be the one attempting to use the application 210, the application 210 may present an authentication prompt. The authentication prompt may be any suitable authentication prompt for the application 210. For example, if the application 210 is the lock-screen process, the application 210 may request a PIN. If the security outcome indicates that no authentication prompt may be required, because the current pattern provides a high level of confidence that the current user has the authorization to perform whatever actions is being attempted with the application 210, because, for example, the current user is the owner, the application 210 may present no authentication prompt, and may continue with the action that caused the application 210 to invoke the security outcome generator 160.

The matched pattern and security outcome may also be displayed on the computing device 100. For example, a message may be displayed on a display 220 of the computing device 100 which may explain both the current pattern that was detected by the pattern detector 130 and the security outcome based on the current pattern. The message may inform the current user of the computing device 100 as to why an authentication prompt was or was not displayed. This may allow the owner or other authorized user of the computing device 100 to make changes to security outcomes for the patterns in the patterns 170 to better suit their security preferences.

FIG. 3 shows an example arrangement for dynamic authorization according to an implementation of the disclosed subject matter. The sensors 110 may include, for example, a camera 301, a microphone 302, a GPS chip 303, a cellular radio 304, a WiFi radio 305, a touchscreen 306, an input detector 307, an accelerometer 308, a clock 309, and external data 310. The camera 301 may generate signals including images, which may be used, for example, for facial recognition or landmark or surroundings recognition. The microphone 302 may generate signals including audio, which may be used, for example, for voice recognition. The GPS chip 303 may generate signals regarding the location and motion of the computing device 100. The cellular radio 304 may generate signals including nearby cellular towers, which may be used to determine the location and motion of the computing device 100. The cellular radio 304 may also be used to ascertain the temporal context of the computing device 100, for example, receiving time, day, date, and time zone information from a cellular network or over a data connection established through the cellular radio 304. The WiFi radio 305 may generate signals including connected and nearby WiFi networks, which may be used to determine the location and motion of the computing device 100, and a passwords or keys entered to access WiFi networks, which may be used to determine the identity of the current user of the computing device 100. The WiFi radio 305 may also be used to ascertain the temporal context of the computing device 100, for example, receiving time, day, date, and time zone information from a data connection established through the WiFi radio 305. The touchscreen 306 may generate signals including touch pressure, touch patterns, and finger size, which may be used, for example, to ascertain the identity of the current user of the computing device 100. The input detector 307 may generate signals including data entered into the computing device 100 by the current user, such as, for example, passwords and PINs, search queries, text messages, emails, applications started and closed by the current user, and any other data inputs from the current user into the computing device 100 that may be used to ascertain the identity of the current user. For example, the correct entry of a password for an account belonging to the owner of the computing device 100 may indicate that is likely that the current user is the owner of the computing device 100. The accelerometer 308 may generate signals regarding the motion and positioning of the computing device 100, which may be used, for example, to ascertain the structural location and dynamics of the computing device 100, for example, on a table, on the floor, or in a pocket of a person who is walking, and the identity of the current user, for example, based on the angle at which the computing device 100 is being held. The clock 309 may be, for example, a system clock, and may generate signals regarding the temporal context of the computing device 100, including the current time, day, date, day of week, and time zone in which the computing device 100 is located. The external data 310 may generate signals based on any other data that may be received by the computing device 100 or processed by the computing device 100, such as, for example, the location of other computing devices that belong to the owner of the computing device 100 relative to the location of the computing device 100, data from a calendar on the computing device 100 that may include indications that the owner of the computing device 100 is traveling, such as flight information, or may otherwise be used to determine where the owner of the computing device 100 may be and therefore where the computing device 100 should be. For example, a calendar may indicate that the owner of the computing device 100 has restaurant reservations at the current time, but the computing device 100 may not be located in the restaurant. This may indicate that the computing device 100 is not with its owner, and any current user of the computing device 100 may not be the owner.

The sensors 110 may include any other suitable hardware and software sensors, including Bluetooth chips, fingerprint scanners, and moisture sensors. The sensors 110 may also be linked to any nearby devices and receive data from the devices, such as, for example, stereo systems, smart televisions, Bluetooth equipment such as headsets and car stereos, and other computing devices which may provide signals that can be used to determine the current usage context of the computing device 100.

The signals from the sensors 110 may be sent to the concept detectors 120. The concept detectors 120 may include, for example, a person detector 321, an action detector 323, a time detector 325, and a place detector 327. The person detector 321 may attempt to determine the identity of a current user of the computing device 100 or of potential users of the computing device 100 given the current context of the computing device 100. For example, the person detector 321 may use facial recognition on images from the camera 301, voice recognition on audio from the microphone 302, signals from the touchscreen 306 and the input detector 307 to attempt to determine whether the current user of the computing device 100 is the owner or other recognized user, or is an unknown user. The action detector 323 may attempt to determine what actions are currently being performed with the computing device 100. For example, the action detector 323 may use signals from the GPS chip 303 and the accelerometer 308 to determine the location and motion of the computing device 100, for example, whether the computing device 100 is resting on a table, is in a pocket of a person who is walking, is being held and used by a person who is still or running, or any other location and motion. The time detector 325 may attempt to determine the temporal context for the computing device 100. For example, the time detector 325 may ascertain the current time, day, date, day of week, and time zone for the computing device 100 based on the clock 309. The place detector 327 may attempt to determine the geographical and structural location of the computing device 100. For example, the place detector 327 may use signals from the GPS chip 303 to determine the geographic coordinates of the computing device 100, which may be correlated with known places and structures to determine if the computing device 100 is inside or outside a specific building, such as a home, business or office, or is in some other recognizable location, such as in a park.

The pattern detectors 130 may receive the concepts from the concept detectors 120, such as the person detector 321, the action detector 323, the time detector 325, and the place detector 327, to determine a current pattern for the computing device 100. For example, the concepts may be combined to form a current pattern, such as, for example, the computing device 100 is being used by its owner in the park at 3:00 pm on a Saturday while the owner is jogging. The current pattern may be analyzed by a machine learning system 335, which may analyze the current pattern and previous patterns to determine recurring patterns and associate the recurring patterns with security outcomes. The current pattern may also be passed to the security outcome generator 160, for example, when the security outcome generator 160 has been invoked by an application such as the application 210.

Figure 4:
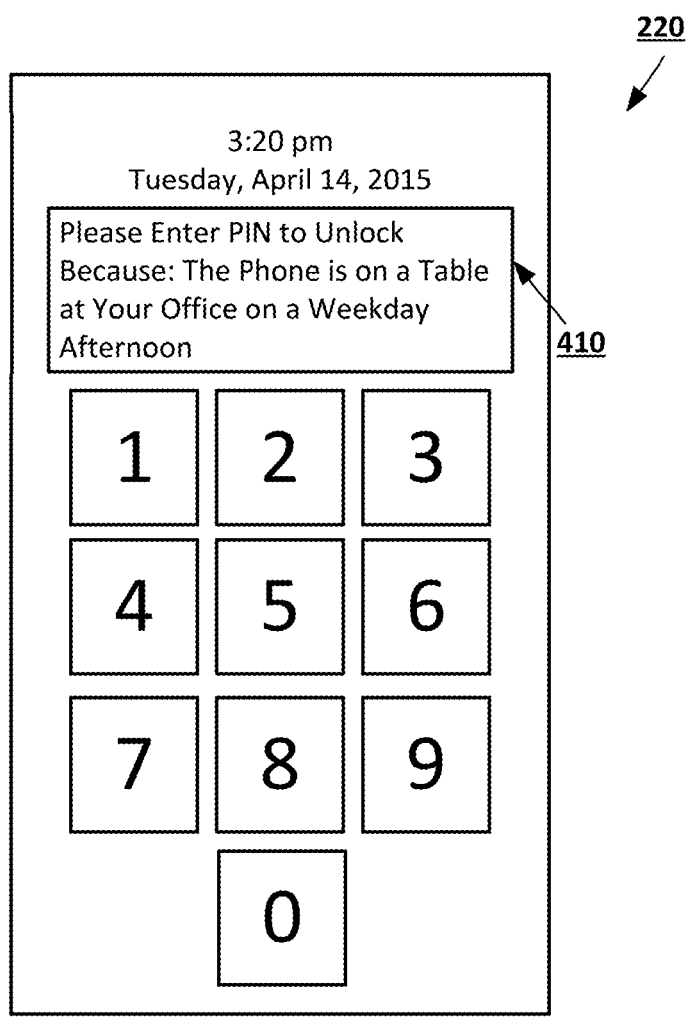
FIG. 4 show an example of a dynamic authorization explanation displayed on a computing device according to an implementation of the disclosed subject matter.

FIG. 4 shows an example of a dynamic authorization explanation displayed on a computing device according to an implementation of the disclosed subject matter. A security outcome, and the matched pattern that resulted in that security outcome, may be displayed to a user. For example, a security message 410 may be sent to the display 220 of the computing device 100 after the security outcome generator 160 has determined whether or not an authentication prompt needs to be presented to the current user. The security message 410 may include any suitable information to notify the current user of the security outcome, including, for example, the security outcome itself, and a description of pattern that was matched to the current pattern based on the concepts from the concept detectors 120.

For example, the application 210 may be the lock-screen process, which may invoke the security outcome generator 160 when a user tries to unlock the computing device 100. The security outcome generator 160 may receive the current pattern from the pattern detector 130, and may match the current pattern to a stored pattern from the patterns 170. The current pattern may indicate that the computing device 100 is in the owner's office building, resting on a table, on Wednesday at 1:00 pm. This may match a stored pattern of the computing device 100 resting on a table on in the owner's building on weekdays in the afternoon. The security outcome associated with the matching stored pattern may indicate that at an authentication prompt should be presented, as a number of possible users who are not the owner may have access to the computing device 100 given the current pattern. The security outcome generator 160 may cause the application 210 to present the authentication prompt requesting a PIN to unlock the computing device 100. The security outcome generator 160 may also send the security message 410 to the display 220. The security message 410 may indicate to the user that an authentication prompt is required to continue their actions, and the matched pattern of the computing device 100 being in on a table in the owner's office building on a Wednesday afternoon that resulted in the requirement of an authentication prompt.

Figure 5:
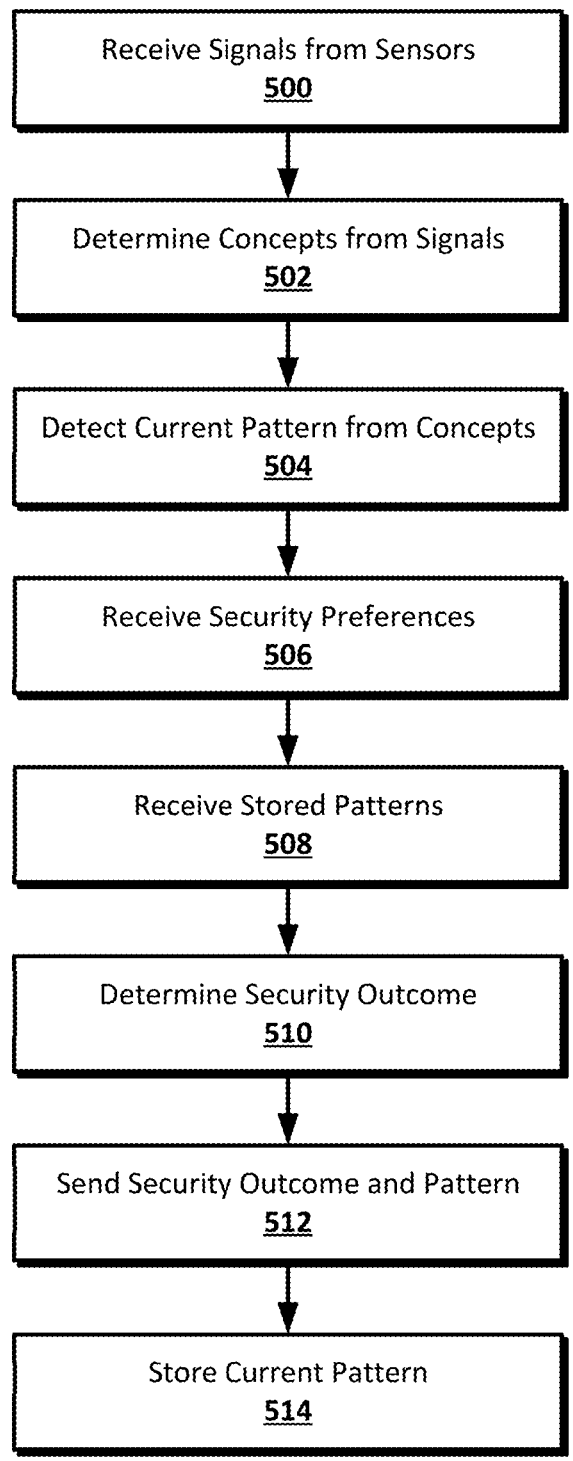
FIG. 5 shows an example of a process for dynamic authorization according to an implementation of the disclosed subject matter.

FIG. 5 shows an example of a process for dynamic authorization according to an implementation of the disclosed subject matter. At 500, signals may be received from sensors. For example, the concept detectors 120 may receive signals from the sensors 110. The signals may be passed through signal collectors, for example, to put the signals in proper format for analysis by the concept detectors 120. The signals may be received on a continuous or discrete basis.

At 502, concepts may be determined from the signals. For example, the concept detectors 120 may determine concepts, such as an identity of a person using the computing device 100, the location of the computing device 100, actions being performed with the computing device 100, and the temporal context of the computing device 100, from the signals received from the sensors 110. The signals may be analyzed in any suitable manner and combination by the concept detectors 120. For example, the same signal may be used to determine both the location of the computing device 100 and actions being performed with the computing device 100.

At 504, a current pattern may be detected from concepts. For example, the pattern detector 130 may receive the concepts determined by the concept detectors 120 and may detect a current pattern for the computing device 100. The current pattern may be a usage context for the computing device 100, for example, where the computing device 100 is located, what the current time is, and who may be using or may have access to the computing device 100. The current pattern may be based on any number of concepts from the concept detectors, detected over any suitable time period. For example, movement of the computing device 100 may be detected through pattern detection on continuously received concepts from the concept detectors 120.

At 506, security preferences may be received. For example, the security outcome generator 160 may receive the security preferences 150 from the storage 140. The security preferences 150 may include any security outcomes changed by a user of the computing device 100 for the patterns 170.

At 508, patterns may be received. For example, the security outcome generator 160 may receive the patterns 170 from the storage 140. The patterns 170 may include patterns that have been previously detected by the pattern detector 130 regarding the usage contexts of the computing device 100, and may be associated with security outcomes.

At 510, a security outcome may be determined. For example, the security outcome generator 160 may have been invoked by the application 210. The security outcome generator may compare the current pattern, as received from the pattern detector 130, to the stored patterns in the patterns 170, to determine which of the stored patterns matches the current pattern. The security outcome generator 160 may determine the security outcome based on the security outcome for the stored pattern that matches the current pattern and the security preferences 150. For example, if the security preferences 150 includes a change to the security outcome for the stored pattern, the security outcome specified for the stored pattern in the security preferences 150 may be used. Otherwise, the security outcome from the patterns 170 may be used. If the current pattern does not match any of the stored patterns in the patterns, the security outcome generator 160 may use a default security outcome, which may be, for example, to present an authentication prompt.

At 512, the security outcome and pattern may be sent. For example, the security outcome generator 160 may send both the security outcome and the pattern that resulted in the security outcome to the invoking application 210. The security outcome may indicate to the application 210 whether or not an authentication prompt should be presented to the current user, requiring some form of authentication before the application 210 continues with the action instructed by the current user that resulted in invocation of the security outcome generator 160. The pattern, for example, the pattern from the patterns 170 that was matched to the current pattern, may also be sent to the display 220, for example, as the security message 410. The security message 410 may display an explanation of the pattern to the current user of the computing device 100, allowing the current user to understand the basis for the security outcome.

At 514, the current pattern may be stored. For example, the current pattern may be stored with the patterns in the patterns 170. The pattern detector 130 may use the current pattern to update or modify characteristics of the patterns in the patterns 170, including the associated security outcomes. The pattern detector 130 may apply, for example, the machine learning system 335 to the patterns 170, including the current pattern. This may result in further refinement of the patterns in the patterns 170, allowing them to better match security outcomes to the various usage contexts of the computing device 100, for example, allowing for more accurate distinctions between situations in which the owner is using the computing device 100, authorized users are using the computing device 100, and other users are using the computing device 100.

Figure 6:
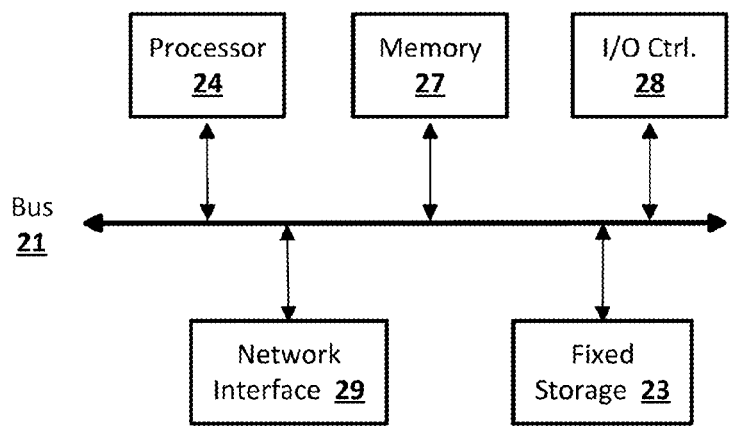
FIG. 6 shows a computer according to an embodiment of the disclosed subject matter.

Embodiments of the presently disclosed subject matter may be implemented in and used with a variety of component and network architectures. FIG. 6 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 7.

Many other devices or components (not shown) may be connected in a similar manner, such as document scanners, digital cameras, auxiliary, supplemental, or backup systems, or the like. Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 7:
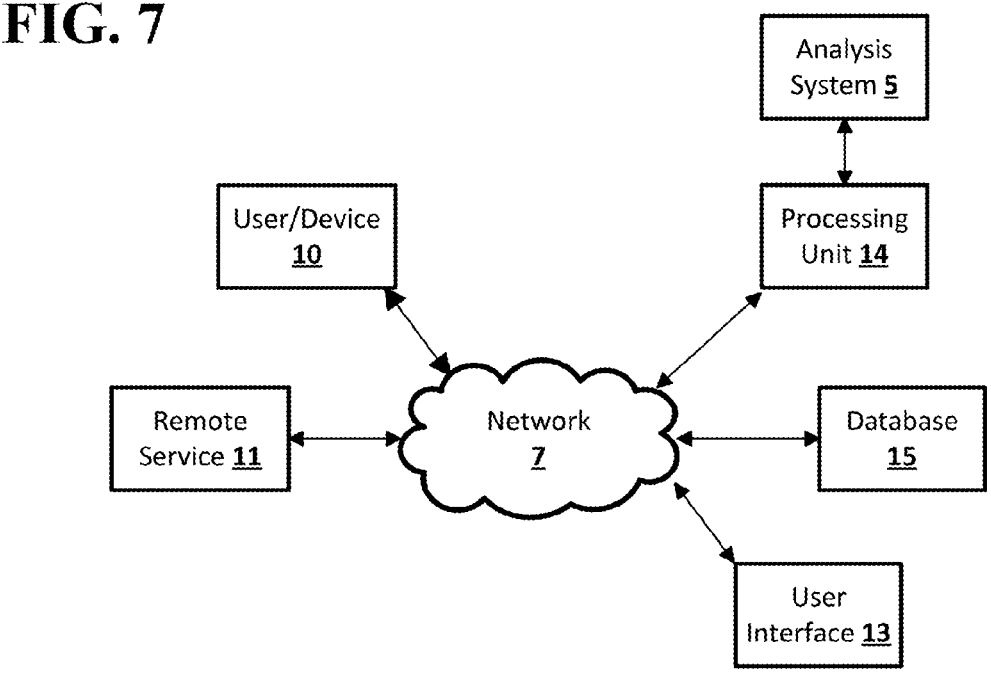
FIG. 7 shows a network configuration according to an embodiment of the disclosed subject matter.

FIG. 7 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

In situations in which the implementations of the disclosed subject matter collect personal information about users, or may make use of personal information, the users may be provided with an opportunity to control whether programs or features collect user information (e.g., a user's performance score, a user's work product, a user's provided input, a user's geographic location, and any other similar data associated with a user), or to control whether and/or how to receive instructional course content from the instructional course provider that may be more relevant to the user. In addition, certain data may be treated in one or more ways before it is stored or used, so that personally identifiable information is removed. For example, a user's identity may be treated so that no personally identifiable information can be determined for the user, or a user's geographic location associated with an instructional course may be generalized where location information is obtained (such as to a city, ZIP code, or state level), so that a particular location of a user cannot be determined. Thus, the user may have control over how information is collected about the user and used by an instructional course provider.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus, the method comprising:
   receiving one or more signals from one or more sensors;
   determining at least one concept from the one or more signals, wherein the at least one concept is a location of a computing device, a temporal context for the computing device, an action being performed with the computing device, or an identity of a user of the computing device;
   determining a current pattern from the at least one concept;
   matching the current pattern to a stored pattern, wherein the stored pattern is associated with a security outcome;
   implementing the security outcome;
   displaying a security message indicating the security outcome and at least part of the stored pattern that was matched to the current pattern;
   determining a second current pattern;
   matching the second current pattern to a second stored pattern;
   determining a security preference associated with the second stored pattern that overrides a security outcome associated with the second stored pattern;
   implementing a security outcome associated with the security preference instead of the security outcome associated with the second stored pattern; and
   displaying a security message indicating the security outcome associated with the security preference instead of the security outcome associated with the second stored pattern.

2. The computer-implemented method of claim 1, wherein the security outcome associated with the stored pattern is one of causing presentation of an authentication prompt or not causing presentation of an authentication prompt.

3. The computer-implemented method of claim 2, wherein the authentication prompt comprises at least one of requesting entry of a PIN, requesting entry of a password, requesting entry of a touch pattern, requesting a facial image, requesting a voiceprint, and requesting a fingerprint.

4. The computer-implemented method of claim 1, wherein the current pattern comprises at least one of a location the computing device is being used in and an identity of at least one user with access to the computing device.

5. The computer-implemented method of claim 1, further comprising storing the current pattern with the stored pattern; and
   at least one of modifying the stored pattern based on the current pattern and creating a new stored pattern based on the current pattern.

6. The computer-implemented method of claim 5, at least one of modifying the stored pattern and creating a new stored pattern further comprises applying a machine learning system to the current pattern and the stored pattern.

7. The computer-implemented method of claim 1, wherein the security outcome associated with the stored pattern is based on a level of confidence that the user of the computing device is at least one of an owner of the computing device or an authorized user of the computing device when the stored pattern is matched by the current pattern.

8. The computer-implemented method of claim 1, wherein at least one of the one or more sensors is one of a camera, a microphone, a touchscreen, a GPS chip, a WiFi radio, a cellular radio, an accelerometer, a clock, an input detector, a fingerprint scanner, and a moisture sensor.

9. The computer-implemented method of claim 1, wherein implementing the security outcome associated with the stored pattern further comprises sending the security outcome associated with the stored pattern to an invoking application, wherein the invoking application invokes the determination of a security outcome based on the actions of a current user of the computing device.

10. A computer-implemented method performed by a data processing apparatus, the method comprising:
    receiving a plurality of signals from a plurality of sensors, wherein the plurality of sensors comprises hardware and software sensors of a computing device;
    determining a plurality of concepts from the plurality of signals, wherein each of the plurality of concepts regards an aspect of the current usage context of the computing device;
    detecting a current pattern from the plurality of concepts, wherein the current pattern regards the current usage context of the computing device;
    storing the current pattern with a plurality of stored patterns;
    applying a machine learning system to the current pattern and the plurality of stored patterns to modify at least one of the stored patterns;
    associating a first security outcome with the stored pattern modified by the machine learning system; and
    storing the stored pattern, modified by the machine learning system, and associated first security outcome with the plurality of stored patterns;
    receiving a second plurality of signals from the plurality of sensors;
    determining a second plurality of concepts from the second plurality of signals;

detecting a second current pattern for the second plurality of signals;

matching the second current pattern to one of the plurality of stored patterns;

implementing a second security outcome associated with the one of the plurality of stored patterns matched with the second current pattern;

displaying a message indicating the one of the plurality of stored patterns matched with the second current pattern and the second security outcome;

detecting a third current pattern;

matching the third current pattern to one of the plurality of stored patterns;

determining a security preference associated with the stored pattern that overrides a third security outcome associated with the stored pattern;

implementing a fourth security outcome associated with the security preference instead of the third security outcome associated with the stored pattern; and displaying a message indicating the fourth security outcome associated with the security preference instead of the third security outcome associated with the third stored pattern.

11. The computer-implemented method of claim 10, wherein the first security outcome is one of causing presentation of an authentication prompt or not causing presentation of an authentication prompt.

12. The computer-implemented method of claim 11, wherein the authentication prompt comprises at least one of requesting entry of a PIN, requesting entry of a password, requesting entry of a touch pattern, requesting a facial image, requesting a voiceprint, and requesting a fingerprint.

13. The computer-implemented method of claim 10, wherein the current pattern comprises at least one of a location the computing device is being used in and an identity of at least one user with access to the computing device.

14. The computer-implemented method of claim 10, wherein the plurality of sensors comprises one or more of a camera, a microphone, a touchscreen, a GPS chip, a WiFi radio, a cellular radio, an accelerometer, a clock, an input detector, a fingerprint scanner, and a moisture sensor.

15. The computer-implemented method of claim 10, wherein implementing the second security outcome further comprises sending the second security outcome to an invoking application, wherein the invoking application invokes the determination of a security outcome based on the actions of a current user of the computing device.

16. A computer-implemented system comprising:

a storage comprising security preferences and stored patterns;

one or more sensors configured to generate at least one signal;

at least one concept detector configured to receive the at least one signal from the one or more sensors and determine at least one concept based on the at least one received signal, wherein the at least one concept is a location of a computing device, a temporal context for the computing device, an action being performed with the computing device, or an identity of a user of the computing device;

a pattern detector configured to detect a current pattern from the at least one concept, store the current pattern in the stored patterns, modify and create new stored patterns, and associate at least one of the stored patterns with a security outcome; and a security outcome generator configured to detect the current pattern, match the current pattern with one of the stored patterns, determine a security outcome associated with a matched stored pattern and a security preference of the security preferences in the storage wherein the security preference is associated with the matched stored pattern, determine that the security preference associated with the matched stored pattern overrides the security outcome associated with the matched stored pattern;

implement a second security outcome associated with the security preference instead of the security outcome associated with the matched stored pattern, and display a security message indicating the second security outcome associated with the security preference instead of the security outcome associated with the matched stored pattern.

17. The computer-implemented system of claim 16, wherein at least one of the sensors is one of a hardware sensor and a software sensor.

18. The computer-implemented system of claim 16, wherein the second security outcome is causing an authentication prompt to be presented or causing an authentication prompt to not be presented.

19. The computer-implemented system of claim 16, wherein the security outcome associated with the at least one of the stored patterns is based on a level of confidence that the user of a computing device is an owner of the computing device or an authorized user of the computing device when the stored pattern matches the current pattern.

20. The computer-implemented system of claim 16, wherein the current pattern regards a current usage context for a computing device.

21. A system comprising: one or more computers and one or more storage devices storing instructions which operate, when executed by the one or more computers, to cause the one or more computers to perform operations comprising:

receiving one or more signals from one or more sensors;

determining at least one concept from the one or more signals, wherein the at least one concept is a location of a computing device, a temporal context for the computing device, an action being performed with the computing device, or an identity of a user of the computing device;

determining a current pattern from the at least one concept;

matching the current pattern to a stored pattern, wherein the stored pattern is associated with a security outcome;

implementing the security outcome;

displaying a security message indicating the security outcome and at least part of the stored pattern that was matched to the current pattern;

determining a second current pattern;

matching the second current pattern to a second stored pattern;

determining a security preference associated with the second stored pattern that overrides a security outcome associated with the second stored pattern;

implementing a security outcome associated with the security preference instead of the security outcome associated with the second stored pattern; and displaying a security message indicating the security outcome associated with the security preference instead of the security outcome associated with the second stored pattern.

* * * * *